United States Patent
Kono

(10) Patent No.: US 9,317,122 B2
(45) Date of Patent: Apr. 19, 2016

(54) ELECTRONIC DEVICE

(75) Inventor: Kenji Kono, Yokohama (JP)

(73) Assignee: KYOCERA Corporation, Kyoto (JP)

(*) Notice: Subject to any disclaimer, the term of this patent is extended or adjusted under 35 U.S.C. 154(b) by 39 days.

(21) Appl. No.: 14/239,526

(22) PCT Filed: Aug. 14, 2012

(86) PCT No.: PCT/JP2012/005151
§ 371 (c)(1),
(2), (4) Date: Feb. 18, 2014

(87) PCT Pub. No.: WO2013/027374
PCT Pub. Date: Feb. 28, 2013

(65) Prior Publication Data
US 2014/0176318 A1    Jun. 26, 2014

(30) Foreign Application Priority Data

Aug. 19, 2011  (JP) .................................. 2011-179821

(51) Int. Cl.
 *G08B 6/00* (2006.01)
 *G06F 3/01* (2006.01)
 *G06F 3/041* (2006.01)
(52) U.S. Cl.
 CPC ................ *G06F 3/016* (2013.01); *G06F 3/041* (2013.01); *G06F 2203/04105* (2013.01)
(58) Field of Classification Search
None
See application file for complete search history.

(56) References Cited

U.S. PATENT DOCUMENTS

| | | | |
|---|---|---|---|
| 5,627,725 A | 5/1997 | Yamada et al. | |
| 6,504,713 B1* | 1/2003 | Pandolfi et al. | 361/695 |
| 6,898,525 B1* | 5/2005 | Minelli | 701/472 |
| 8,203,534 B2* | 6/2012 | Nishimura et al. | 345/173 |
| 8,576,186 B2* | 11/2013 | Imai | G06F 1/1643 345/173 |
| 8,711,111 B2* | 4/2014 | Iwawaki | G06F 1/1626 345/173 |
| 8,957,867 B2* | 2/2015 | Dietz et al. | 345/173 |
| 2008/0246741 A1* | 10/2008 | Hinata | 345/173 |

(Continued)

FOREIGN PATENT DOCUMENTS

| | | |
|---|---|---|
| JP | 05-143233 A | 6/1993 |
| JP | 07-231178 A | 8/1995 |
| JP | 08-130381 A | 5/1996 |

(Continued)

OTHER PUBLICATIONS
International Search Report; PCT/JP2012/005151; Nov. 20, 2012.

*Primary Examiner* — Julie Lieu
(74) *Attorney, Agent, or Firm* — Studebaker & Brackett PC

(57) ABSTRACT

An electronic device includes: a touch panel 30; an elastic member 70 that supports the panel 30 to be capable of vibration in a position of an opening 11 of a housing 10; a vibration unit 60 that vibrates the panel 30; a display unit 40 on a rear side of the panel 30 with space therebetween; a substrate 50 on a rear side of the unit 40 with space therebetween; and a support portion 13 provided in the housing 10 to support a periphery of the rear of the unit 40. A surface 31 of the panel 30 and a surface 15 of the housing 10 are provided with a flexible member 20 over a gap 14 between a periphery of the panel 30 and the housing 10. The unit 40 is supported airtightly to the portion 13 around the periphery of the rear of the unit 40.

3 Claims, 6 Drawing Sheets

(56) References Cited

U.S. PATENT DOCUMENTS

| | | | |
|---|---|---|---|
| 2011/0050596 A1* | 3/2011 | Park | G06F 1/1626 345/173 |
| 2011/0102341 A1 | 5/2011 | Imai et al. | |
| 2011/0102342 A1* | 5/2011 | Iwawaki et al. | 345/173 |
| 2011/0102343 A1* | 5/2011 | Imai et al. | 345/173 |
| 2011/0285659 A1* | 11/2011 | Kuwabara | G06F 3/041 345/173 |
| 2013/0207918 A1* | 8/2013 | Kono et al. | 345/173 |

FOREIGN PATENT DOCUMENTS

| | | |
|---|---|---|
| JP | 2005-209868 A | 8/2005 |
| JP | 2007-034736 A | 2/2007 |
| JP | 2007-293488 A | 11/2007 |
| JP | 2007-316861 A | 12/2007 |
| JP | 2010-044497 A | 2/2010 |
| JP | 2010-282534 A | 12/2010 |
| JP | 2011-113461 A | 6/2011 |

* cited by examiner

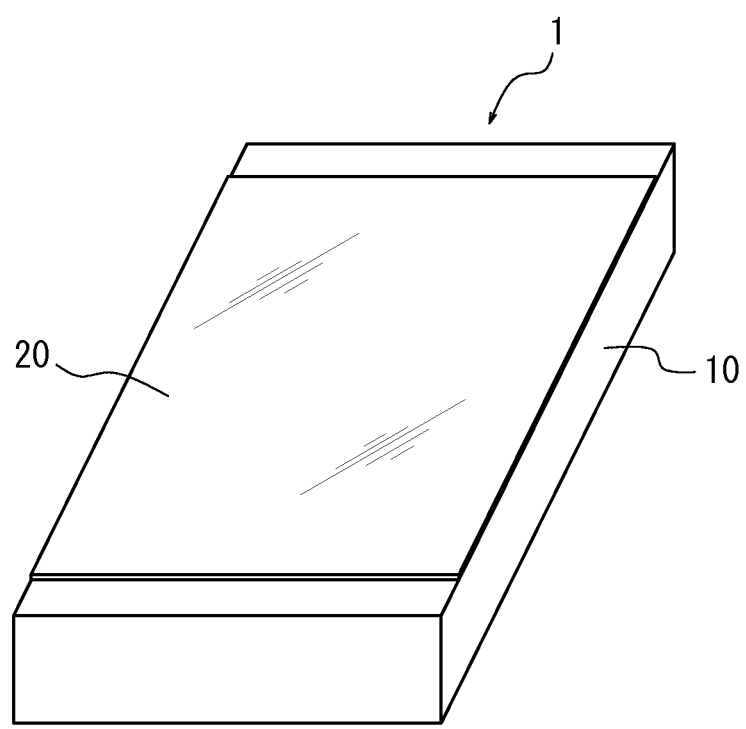

ELECTRONIC DEVICE

CROSS-REFERENCE TO RELATED APPLICATION

This application claims priority to and the benefit of Patent Application No. 2011-179821 filed in Japan on Aug. 19, 2011, the entire contents of which are incorporated herein by reference.

FIELD

The present invention relates to an electronic device. In detail, the present invention relates to an electronic device that is configured to detect an operation input made to a touch panel and provide an operational feeling as a feedback.

BACKGROUND

Currently, a wide range of electronic devices adopt touch panels, touch pads, and the like (which are collectively referred to below as touch panels) as input devices. There have been proposed a variety of input devices in which, when an operator operates a touch panel, the touch panel undergoes vibration to thereby provide the operator with an operational feeling on a finger or the like as a feedback. (Refer to Patent Literature 1, for example.)

FIG. 8 is an exploded external perspective view of the electronic device described in Patent Literature 1. As illustrated in FIG. 8, the electronic device (display device) described in Patent Literature 1 includes a display monitor 100, a panel fixing frame 210, a touch panel 400, and a cover 500. The electronic device is configured by assembling the components such as the touch panel 400 to the display monitor 100.

In the electronic device described in Patent Literature 1, the display monitor 100 is configured by using a liquid crystal display (LCD), and the whole display monitor 100 has a rectangular and flat shape. The display monitor 100 is mounted to a circuit substrate that is not illustrated, and in accordance with control by a display control circuit mounted on the circuit substrate, the display monitor 100 displays objects such as a key or a button, or various information on a display surface thereof. Over the display surface of the display monitor 100, the touch panel 400 having substantially the same size as the monitor 100 is disposed.

The touch panel 400 includes, for example, a transparent resin plate and a matrix switch circuit formed on the transparent resin plate. The touch panel 400 is configured to output, in response to a contact made to the panel surface by the finger of the operator or the like, a detection signal corresponding to a position of the contact to a touch panel control circuit mounted on a circuit substrate that is not illustrated. That is to say, by making an operation to the touch panel 400 in accordance with display on the display monitor 100 shown through the touch panel 400, the operator is able to input to the electronic device various information in accordance with the display.

In the electronic device, a piezoelectric element (piezo-element) 420 is adhered along each of two opposing sides on a rear surface of the touch panel 400. When the touch panel 400 detects a contact made by the operator, the electronic device applies a drive signal (voltage) to the piezoelectric elements 420 from a piezoelectric element driving circuit mounted on a circuit substrate that is not illustrated. Consequently, the piezoelectric elements 420 are expanded and contracted, thereby generating a vibration on the operation surface of the touch panel 400. In other words, by the touch panel 400 being vibrated in response to the operation, the operator is able to achieve the operational feeling.

The touch panel 400 is assembled to the display monitor 100 via the panel fixing frame 210. The panel fixing frame 210 is constituted by using a hard resin material such as ABS and accordingly, the entire panel fixing frame 210 has rigidity.

Holders 220, for holding the touch panel 400 at four corners thereof, are assembled to the panel fixing frame 210. FIG. 9 is an enlarged view illustrating that one of the four holders 220 is attached to a corner of the touch panel 400. Each holder 220 is provided with a slit-shaped insert portion 360 into which a corner of the touch panel 400 may be inserted. Furthermore, as illustrated in FIG. 8, each peripheral side surface of the panel fixing frame 210 is provided with fixing holes 320 for fixing a holder 220 near an end portion of the side surface. By inserting hooks 340a provided in the holders 220 as illustrated in FIG. 9 into the fixing holes 320 of FIG. 8, each holder 220 fixes the touch panel 400 to the panel fixing frame 210.

In this way, when the four corners of the touch panel 400 are inserted to the holders 220, each holder 220 holds the touch panel 400 by locking the touch panel 400 from outside at the four corners and from both sides in a thickness direction. As a result, the electronic device described in Patent Literature 1 may be arranged with the touch panel 400 being fixed.

The holders 220 are integrally molded by using a material, such as a silicon-based resin or rubber, having a smaller elastic coefficient than the panel fixing frame 210. Thus, the holders 220 stably hold the touch panel 400 and are also configured to be elastically deformable so as to allow vibration of the touch panel 400. There is also secured a gap between the touch panel 400 and the display monitor 100, for allowing displacement of the touch panel 400 in the thickness direction. As a result, during vibration of the piezoelectric element 420, the touch panel 400 may be displaced in the thickness direction in accordance with the vibration.

Thus, the electronic device described in Patent Literature 1 is configured not to prevent, at the time of vibrating the touch panel 400, the vibration significantly, and therefore, the electronic device is capable of maintaining a good operational feeling provided by the vibration of the touch panel 400.

CITATION LIST

Patent Literature 1: Japanese Patent Application Publication No. 2010-44497

SUMMARY

However, it is assumed that the electronic device described in Patent Literature 1 is, for example, a display device used in a car navigation system, and any dust-proof measures are not particularly taken for the electronic device itself. For example, when the electronic device illustrated in FIG. 8 is assembled, the touch panel 400 is attached to the panel fixing frame 210 in a manner such that the touch panel 400 is inserted into the insert portions 360 of the holders 220 made of the elastic material, i.e., inserted via the holders 220. The reason is that, if the touch panel 400 is tightly fixed to the panel fixing frame 210, the touch panel 400 may not be displaced in the thickness direction during vibration of the piezoelectric elements 420, and the touch panel 400 may not vibrate well. As a result, the gap is formed between the touch panel 400 and the panel fixing frame 210, and it is fairly likely that dust enters from the gap and attaches to the display surface of the display monitor 100.

One possible countermeasure against dust is to insert an elastic member such as a compressible dust-proof cushion into the gap provided between the touch panel 400 and the panel fixing frame 210, for example. However, when the compressible elastic member is inserted, the elastic member is always positioned between the touch panel 400 and the panel fixing frame 210, and both end surfaces of the elastic member are pushed. The result of the above configuration is that sufficient amplitude is not achieved during vibration of the touch panel.

It is also assumed that the display device is provided with, for example, an external input/output unit for a power supply, images, and the like that is connected to the circuit substrate. In this circumstance, dust may enter from, for example, an insertion opening of a connector pin of the external input/output unit and adhere to the display surface of the display monitor 100. Despite the above, in the electronic device described in Patent Literature 1, any dust-proof measures are not taken for the display monitor 100 to prevent dust from entering areas from other than an area near the touch panel 400.

In view of the above problems, the present invention is to provide an electronic device in which a dust-proof measure for the display unit is taken by preventing vibration of the touch panel from being attenuated.

An electronic device of the present invention includes: an electronic device comprising: a touch panel; an elastic support member configured to support the touch panel such that the touch panel is capable of vibration in a position of an opening portion of a housing; a vibration unit configured to vibrate the touch panel; a display unit disposed on a side of a rear surface of the touch panel such that the display unit is spaced apart from the rear surface of the touch panel; a circuit substrate disposed on a side of a rear surface of the display unit such that the display unit is spaced apart from the rear surface of the display unit; and a support portion provided in the housing and configured to support a peripheral portion of the rear surface of the display unit, wherein a surface of the touch panel and a surface of the housing are provided with a flexible sheet member over a gap provided between a periphery of the touch panel and the housing, and the display unit is supported air-tightly relative to the support portion around the entire peripheral portion of the rear surface of the display unit.

In one embodiment, the support portion is provided to protrude from an inner wall of the housing around the entire peripheral portion of the rear surface of the display unit.

In one embodiment, the support portion is provided to protrude in a frame shape from a bottom portion of the housing around the entire peripheral portion of the rear surface of the display unit.

According to the present invention, an electronic device in which a dust-proof measure for a display unit is taken by preventing vibration of a touch panel from being attenuated.

BRIEF DESCRIPTION OF DRAWINGS

The present invention will be further described below with reference to the accompanying drawings, wherein:

FIG. 1 is an external perspective view of an electronic device according to an embodiment of the present invention;

DESCRIPTION OF EMBODIMENTS

Embodiments of the present invention will be described with reference to the drawings.

FIG. 1 is a perspective view of an entire electronic device according to an embodiment of the present invention. The electronic device 1 according to the present embodiment, from a standpoint of an external appearance, includes a housing 10 and a flexible sheet member 20. The housing 10 is preferably made of a material that is capable of withstanding a certain level of shock. For example, the housings 10 may be a resin case. Although in the illustrated example the housing 10 is illustrated as a single housing, an upper housing and a lower housing may be integrally combined to form the housing 10. In this case, an appropriate dust-proof measure is taken between the upper housing and the lower housing, for example, by sealing the housings by a rubber packing.

Figure 2A:
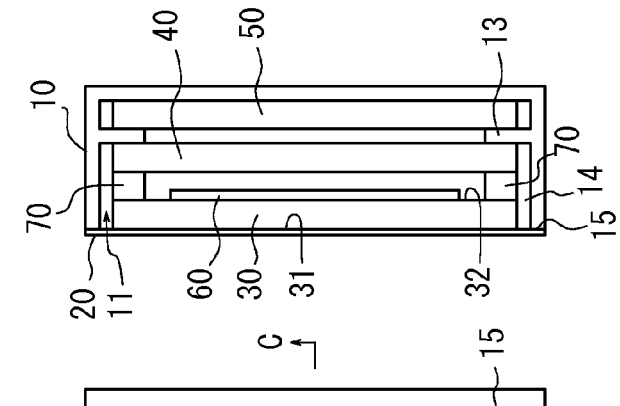
FIG. 2 illustrates a schematic internal configuration of the electronic device of FIG. 1.
Figure 2B:
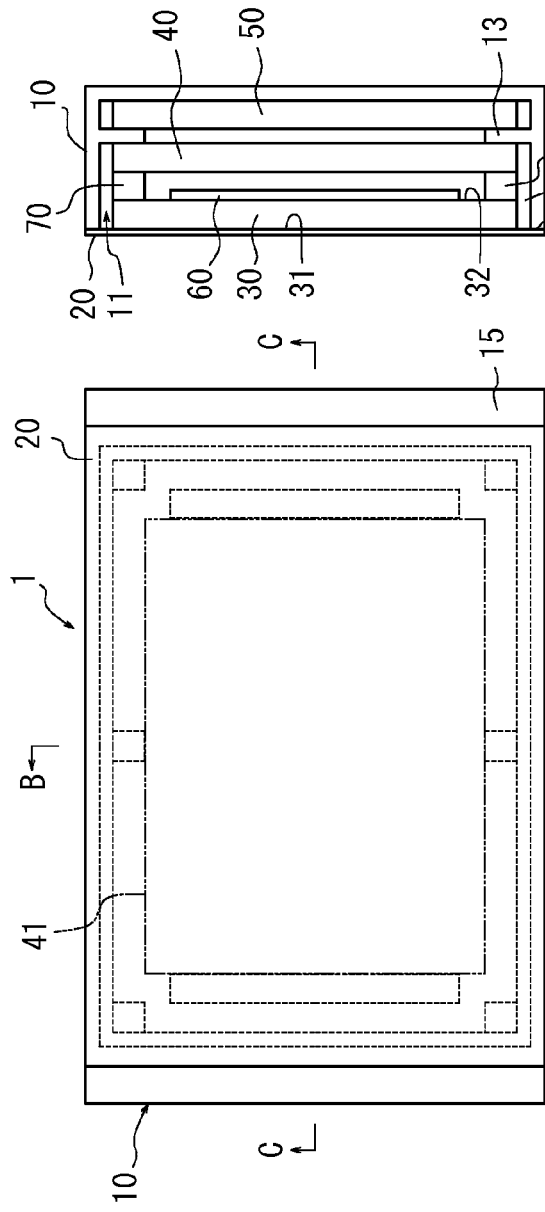
Figure 2C:
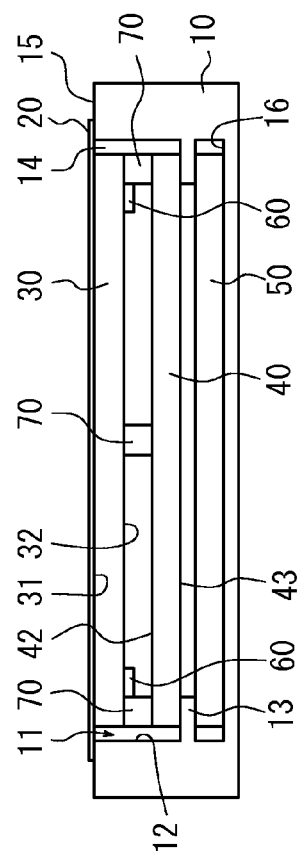

FIGS. 2A-2C illustrate a schematic internal configuration of the electronic device 1 of FIG. 1. FIG. 2A is a plan view, FIG. 2B is a section view taken along a line B-B of FIG. 2A, and FIG. 2C is a section view taken along a line C-C of FIG. 2A. The housing 10 includes a rectangular opening portion 11 on a surface side thereof, and the touch panel 30 is disposed in a position of the opening portion 11. On a side of a rear surface of the touch panel 30, the display unit 40 is disposed such that the display unit 40 is spaced apart from the rear surface of the touch panel 30. Furthermore, on a side of a rear surface of the display unit 40, the circuit substrate 50 is disposed such that the circuit substrate 50 is spaced apart from the rear surface of the display unit 40.

The touch panel 30 may be a transparent one of a resistive film type, a capacitive type, an optical type, and the like, for example. Although the touch panel 30 has a rectangular shape in the example illustrated in FIG. 2, the touch panel 30 may have a square shape. In the description herein, the "rectangular shape" and the "square shape" include a shape with four sides made up of not only straight lines but also curved lines.

The touch panel 30 is connected to the touch panel control circuit and detects a contact made by a finger of an operator, a stylus pen, or the like (which are collectively referred to below simply as a "contacting object") to a touch face (surface) 31 of the touch panel 30 for an object displayed on the display unit 40 by the touch panel control circuit. The touch panel 30 also detects a position of the contact made to the touch face 31 by the contacting object. Note that a physical contact to the touch panel 30 by the contacting object is not necessarily required in terms of the detection of the contact by the contacting object. For example, when the touch panel 30 is of an optical type, it is not necessary for the contacting object to make contact with the touch panel 30 since the touch panel 30 detects a position on the touch panel 30 where an infrared ray is blocked by the contacting object.

In an area on a surface (rear surface) 32 opposite to the touch face 31 of the touch panel 30 outside a display area 41 of the display unit 40 as illustrated by a virtual line in FIG. 2A, two vibration units 60 are provided. In the present embodiment, the two vibration units 60 are fixedly provided by a double-sided adhesive tape, an adhesive agent, or the like in the vicinity of short sides of the touch panel 30 such that the two vibration units 60 extend substantially in parallel in a direction along the short sides of the touch panel 30.

Each vibration unit 60 provides a tactile sensation to the contacting object that is in contact with the touch panel 30, by generating vibration in accordance with a predetermined vibration pattern. In the present embodiment, the vibration unit 60 is configured by using a piezoelectric element and the like and displaced by undergoing expansion and contraction in a longitudinal direction in accordance with a drive signal received from the piezoelectric element driving circuit. Accordingly, the touch panel 30 undergoes a flexure vibration with long sides as pivots in accordance with a predetermined vibration pattern corresponding to the drive signal, and the tactile sensation is provided to the contacting object that is in contact with the touch face 31.

The display unit 40 may be configured by using, for example, a liquid crystal display (LCD) panel, an organic EL display panel, and the like. The display unit 40 graphically displays an object of a push button switch (push-type button switch) or the like, such as a key, in accordance with control by the display control circuit. The object refers to an image for suggesting to the operator an area to be touched on the touch face 31 of the touch panel 30. The push button switch refers to a button, a key, or the like (which are collectively referred to below simply as a "key etc.") that the operator uses for an input operation. In the description herein, a detailed description of matters related to display is omitted.

The circuit substrate 50 is equipped with circuits necessary for operations of the electronic device 1, such as the aforementioned touch panel control circuit, the piezoelectric element driving circuit, and the display control circuit. The circuit substrate 50 is connected to the touch panel 30, the vibration unit 60, and the display unit 40 via a flexible wiring substrate, or FPC (Flexible Printed Circuit), or the like. When the housing 10 is provided with the external input/output unit for the power supply, images, and the like, the circuit substrate 50 is equipped with a circuit corresponding to the external input/output unit, and the circuit substrate 50 is connected with the external input/output unit via the FPC or the like.

In the present embodiment, the display unit 40 is supported, on a surface (rear surface) 43 thereof opposite to an image display surface (surface) 42, by a support portion 13 formed on an inner wall 12 of the housing 10. The support portion 13 is formed to extend from the inner wall 12 of the housing 10 and protrude convexly around an entire peripheral portion of the rear surface 43 of the display unit 40. The display unit 40 is fixedly supported by the support portion 13 around the entire peripheral portion of the rear surface 43 thereof. Note that the display unit 40 may be fixed to the support portion 13 in a conventional manner using the adhesive agent, the double-sided adhesive tape, screw fastening, or the like. With the display unit 40 being air-tightly supported by the support portion 13 using the adhesive agent, the double-sided adhesive tape, screw fastening, or the like, the risk that dust might enter a side of the surface of the display unit 40 from the circuit substrate 50 is reduced. Note that the degree of the air-tightness between the display unit 40 and the support unit 13 only needs to be sufficient enough to prevent the risk that dust might enter the side of the surface of the display unit 40 from the circuit substrate 50, and there is no need for a perfect air-tightness that would shut off air completely.

The touch panel 30 is supported by the surface 42 of the display unit 40 via elastic support members 70 such that the vibration unit 60 is capable of vibrating the touch panel 30 in a position of the opening portion 11 of the housing 10. In the present embodiment, the touch panel 30 is supported by the surface 42 of the display unit 40 outside the display area 41 thereof via the elastic support members 70 at three points in both end portions and a middle portion outside the display area 41 of the display unit 40 along each long side as the pivot of vibration of the vibration unit 60 on the rear surface 32 of the touch panel 30 (i.e. at six points in total along both the long sides) outside the display area 41 of the display unit 40. Note that the opening portion 11 of the housing 10 has a dimension by which a gap 14 is provided between side surfaces of the touch panel 30 and the housing 10 around a periphery of the touch panel 30 to the extent where the vibration of the touch panel 30 is not affected.

The sheet member 20 is configured to reduce the risk that dust might enter from the gap 14 around periphery of the touch panel 30 and is arranged over the gap 14 by being adhered to the surface 31 of the touch panel 30 and the surface 15 of the housing 10 using the adhesive agent, the double-sided adhesive tape, and the like. Although the sheet member 20 does not necessarily cover the entire surface of the touch panel 30 as long as the sheet member 20 extends over the gap 14, in the present embodiment the sheet member 20 is provided to cover the entire surface of the touch panel 30 so as to protect the touch panel 30 from a scratch or the like. Accordingly, in the present embodiment, the sheet member 20 is transparent at least in an area thereof corresponding to the display area 41 of the display unit 40. The thickness of the sheet member 20 may be appropriately set depending on durability or the like. The sheet member 20 may be made of a flexible material such as PET (polyethylene terephthalate) or the like.

The circuit substrate 50 is disposed between a bottom portion 16 of the housing 10 and the display unit 40, and in the illustrated example, the circuit substrate 50 is disposed between the bottom portion 16 and the support portion 13. The FPC of the touch panel 30 and the vibration unit 60 may be air-tightly passed between the display unit 40 and the support portion 13 by using the double-sided adhesive tape or the like to be connected to the circuit substrate 50. In another example, an opening for the FPC to pass through is provided in a part of the support portion 13, and the FPC is passed through the opening to be connected to the circuit substrate 50. Subsequently, the opening is blocked by resin or the like. In yet another example, a relay connector is provided in the display unit 40, and the EPC is connected to the circuit substrate 50 via the relay connector.

The electronic device 1 according to the present embodiment configured as above causes the display unit 40 to display the key etc. As a result, the key or the like are visually perceived through the touch panel 30. In this regard, when the operator touches a portion of the touch panel 30 in which the key etc. is perceived by using the contacting object, the vibration unit 60 is actuated, and the touch panel 30 undergoes flexure vibration. Accordingly, the tactile sensation of the feeling that a push button is pressed is provided to the contacting object that is in contact with the touch panel 30.

Furthermore, the gap 14 between the periphery of the touch panel 30 and the housing 10 is covered by the flexible sheet member 20, and the display unit 40 is fixed to the support portion 13 formed to protrude from the inner wall 12 of the housing 10 around the entire peripheral portion of the rear surface 43 of the display unit 40. Accordingly, compared with a dust-proof structure in which the elastic member is interposed around the entire periphery between the touch panel 30 and the support member for the touch panel 30 (the display unit 40 in the present embodiment), attenuation of vibration of the touch panel 30 is prevented, and a dust-proof function for the surface 42, which is the image display surface of the display unit 40, is sufficiently exerted.

In the following, a description is given of various embodiments of the above-described electronic device 1 with reference to FIGS. 3-7. FIGS. 3-7 correspond to the section view of FIG. 2C, and components with functions similar to those of the aforementioned components are assigned with identical reference signs and descriptions thereof are omitted.

Figure 3:
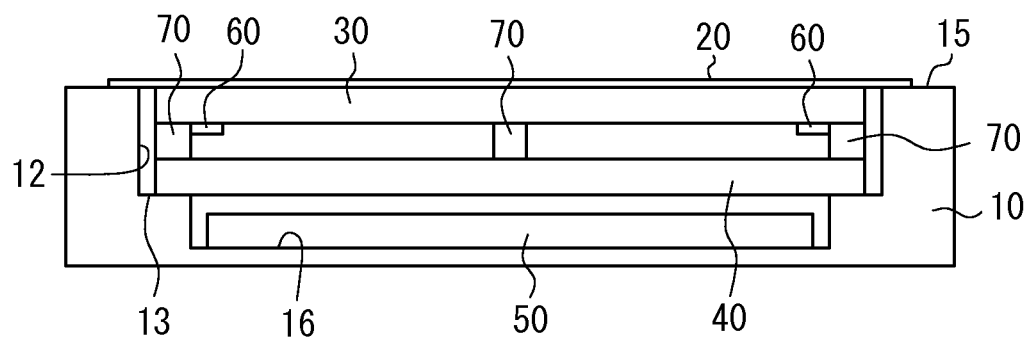
FIG. 3 illustrates another embodiment of the electronic device of FIG. 1.
Figure 4:
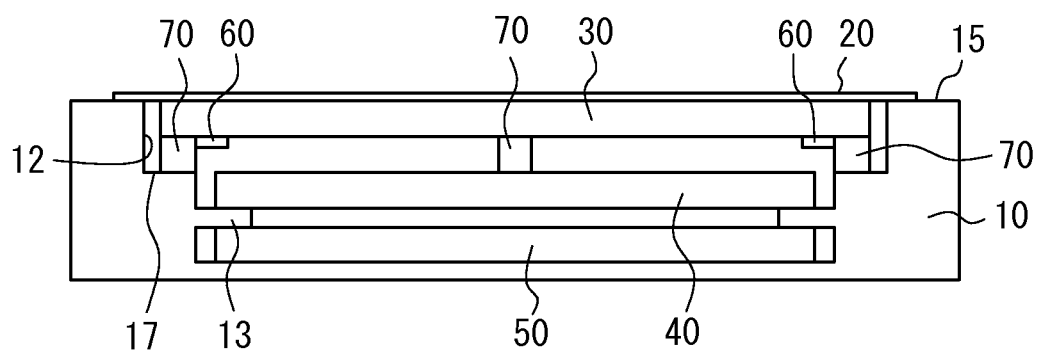
FIG. 4 illustrates yet another embodiment of the electronic device of FIG. 1.

An embodiment illustrated in FIG. 3 forms the support portion 13 of the display unit 40 to protrude from the inner wall 12 to the bottom portion 16 of the housing 10 in a stepwise manner. An embodiment illustrated in FIG. 4 provides the housing 10 with a stepped portion 17 configured to support the touch panel 30 and supports the touch panel 30 by the stepped portion 17 via the elastic support members 70 such that the touch panel 30 is capable of vibration. An embodiment illustrated in FIG. 5 combines a support structure of the display unit 40 as illustrated in FIG. 3 with a support structure of the touch panel 30 as illustrated in FIG. 4.

Figure 5:
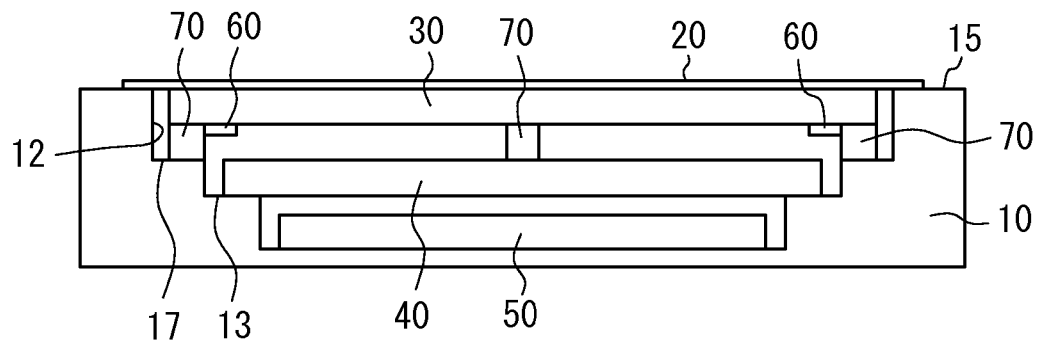
FIG. 5 illustrates yet another embodiment of the electronic device of FIG. 1.
Figure 6:
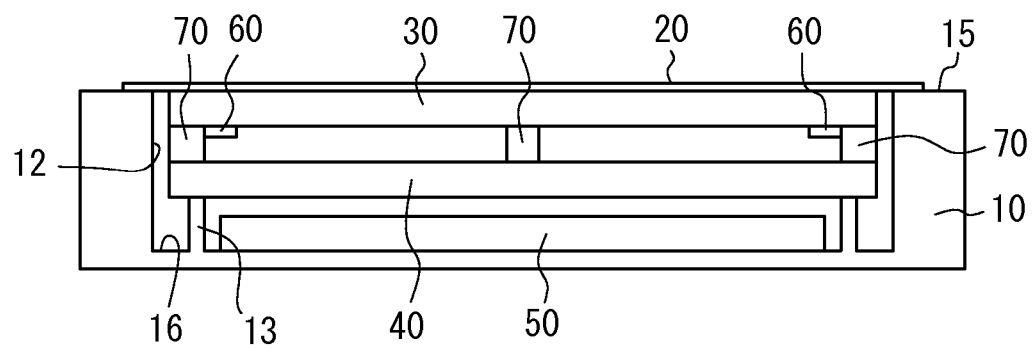
FIG. 6 illustrates yet another embodiment of the electronic device of FIG. 1.
Figure 7:
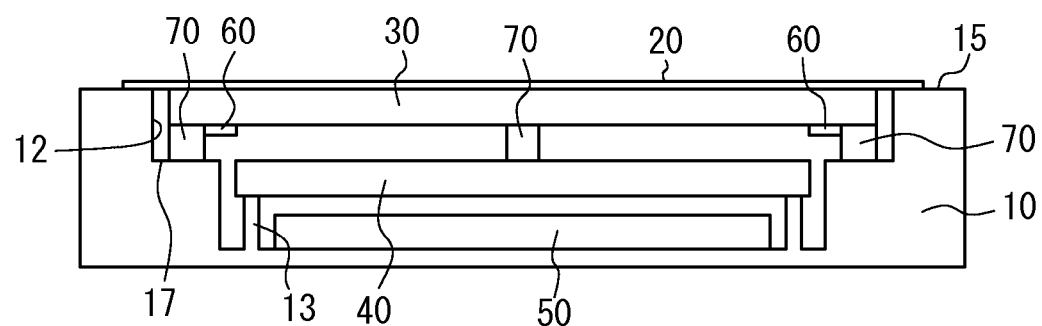
FIG. 7 illustrates yet another embodiment of the electronic device of FIG. 1.
Figure 8:
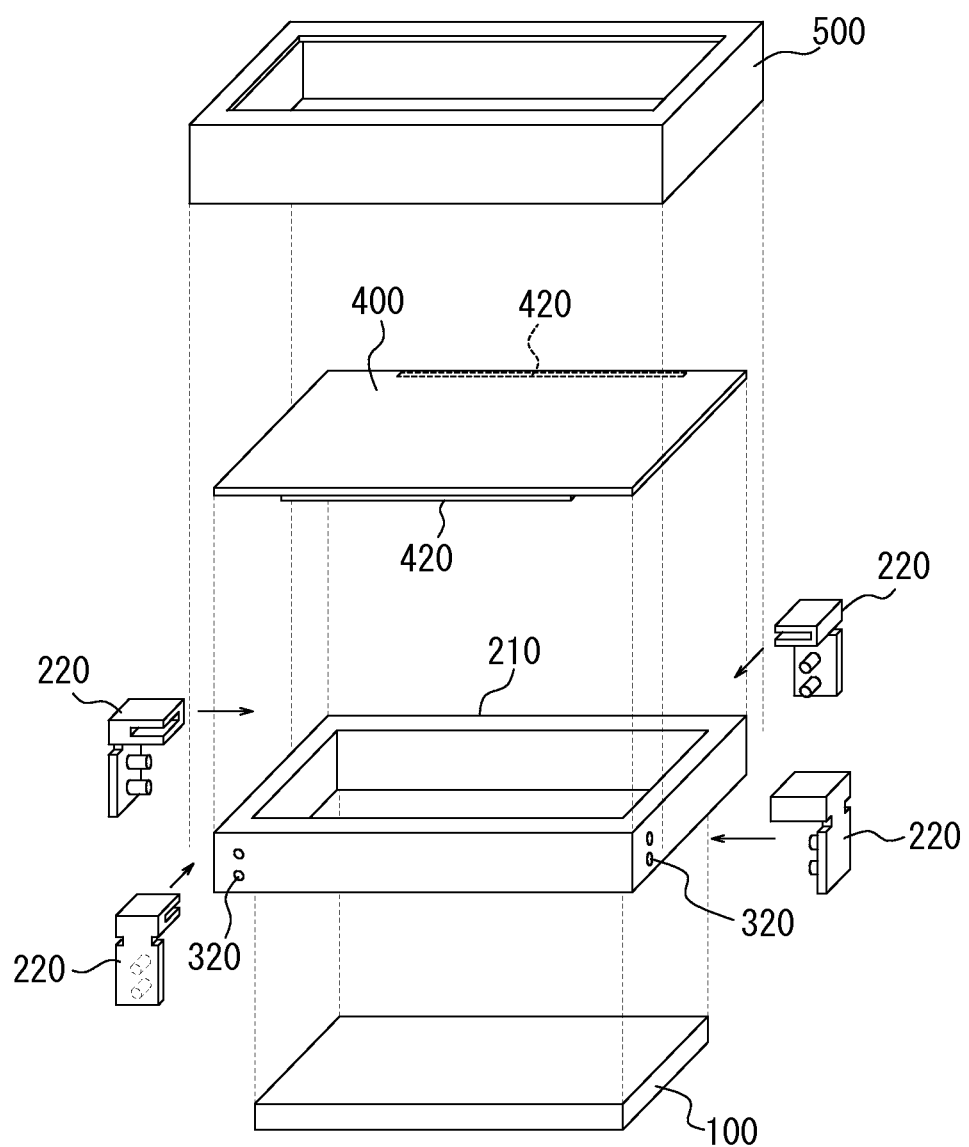
FIG. 8 is an exploded perspective view illustrating a configuration of a conventional electronic device.
Figure 9:
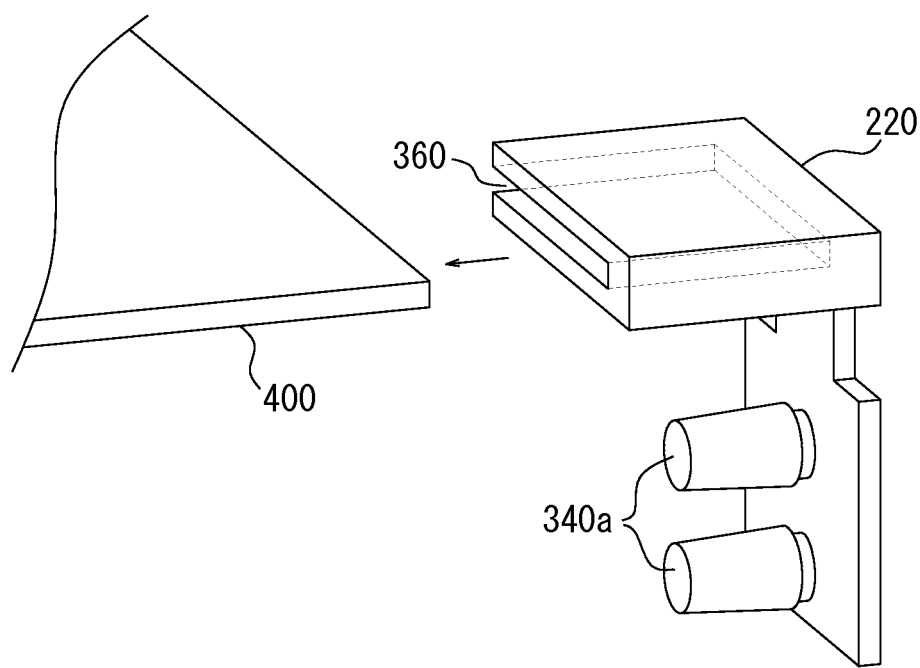
FIG. 9 is a partial enlarged perspective view of FIG. 8.

An embodiment illustrated in FIG. 6 provides the support portion 13 of the display unit 40 to protrude in a frame shape from the bottom portion 16 of the housing 10 around the entire peripheral portion of the rear surface of the display unit 40, i.e., to stand from the bottom portion 16. The display unit 40 is fixed to an upper surface of the support portion 13. An embodiment illustrated in FIG. 7 renders a support structure of the touch panel 30 as in FIG. 6 similar to support structures as illustrated in FIGS. 4 and 5. In FIGS. 6 and 7, when there is the external input/output unit connected to the circuit substrate 50, the external input/output unit may have the dust-proof structure independently so as to prevent the external input/output unit from communicating with a space in which the surface 42 of the display unit 40 is located, or the support portion 13 may be appropriately deformed so that the external input/output unit is present in a space in which the circuit substrate 50 is located.

In the electronic device illustrated in FIGS. 3-7, similarly to the electronic device 1 illustrated in FIG. 2, attenuation of vibration of the touch panel 30 is prevented, and the dust-proof function for the surface 42, which is the image display surface of the display unit 40, is sufficiently exerted.

Note that the present invention is not limited to the above embodiments, and additional modifications and changes are possible. For example, it is not necessary to provide the support portion 13 of the display unit 40 around the entire peripheral portion of the rear surface of the display unit 40, and the support portion 13 may be provided at a portion thereof with, for example, a cutting through which the FPC of the touch panel 30 and the vibration unit 60 passes. In such a case, by extending a sheet-like member used for blocking from the rear surface 43 of the display unit 40 and blocking the cutting by the sheet-like member, the display unit 40 may be supported air-tightly relative to the support portion 13 around the entire peripheral portion of the rear surface of the display unit 40.

Note that the number of the vibration units 60 for vibrating the touch panel 30 is not limited to two and may be any number in accordance with desired amplitude of vibration. The vibration unit 60 may also be configured by providing translucent piezoelectric elements on the entire surface of the touch panel 30, or by using a vibrating motor (eccentric motor). Furthermore, the number of the elastic support members 70, which are configured to support the touch panel 30 such that the touch panel 30 is capable of vibration, is not limited to six and appropriately changed to provide support at four, eight, or any number of points. The touch panel 30 may also be supported by side surfaces of the opening portion 11 of the housing 10 such that the touch panel 30 is capable of vibration.

Moreover, the touch panel 30 is not necessarily configured to detect a position of a contact and may be configured to simply detect presence of a contact. The touch panel 30 may also be provided with a pressure detection unit configured to detect pressure, for example. Then, it is possible, in a case where data based on the pressure detected by the pressure detection unit satisfies a predetermined standard, to determine that a contact is made to the touch panel 30 or to provide a tactile sensation by actuating the vibration unit 60. The case where the data based on the pressure satisfies the predetermined standard refers to when the data based on the pressure reaches the predetermined standard, when the data based on the pressure exceeds the predetermined standard, or when a value corresponding to the predetermined standard is detected.

Such a pressure detection unit may be constituted by providing any number of strain gauge sensors or the like to the touch panel 30, or, when the vibration unit 60 is configured using the piezoelectric elements, by using the piezoelectric elements in combination. The pressure detection unit may also be constituted according to a type of the contact detection employed in the touch panel 30. For example, in a case of a resistive film type, the pressure detection unit may be configured to obtain the data based on the pressure from changes in output signal based on changes in resistance depending on a contact area. In a case of a capacitive type, the pressure detection unit may be configured to obtain the data based on the pressure from the changes in output signal based on changes in capacitance.

REFERENCE SIGNS 1 electronic device
10 housing
11 opening portion of housing
12 inner wall of housing
13 support portion
14 gap
15 surface of housing
16 bottom portion of housing
17 stepped portion
20 sheet member
30 touch panel
31 touch face (surface) of touch panel
32 rear surface of touch panel
40 display unit
41 display area
42 image display face (surface) of display unit
43 rear surface of display unit
50 circuit substrate
60 vibration unit
70 elastic support member

The invention claimed is:
1. An electronic device comprising:
a touch panel;
an elastic support member configured to support the touch panel such that the touch panel is capable of vibration in a position of an opening portion of a housing;
a vibration unit configured to vibrate the touch panel;

a display unit disposed on a side of a rear surface of the touch panel such that the display unit is spaced apart from the rear surface of the touch panel;

a circuit substrate disposed on a side of a rear surface of the display unit such that the display unit is spaced apart from the rear surface of the display unit; and a support portion provided in the housing and configured to support a peripheral portion of the rear surface of the display unit, wherein a surface of the touch panel and a surface of the housing are provided with a flexible sheet member over a gap provided between a periphery of the touch panel and the housing, and the display unit is supported air-tightly relative to the support portion around the entire peripheral portion of the rear surface of the display unit.

2. The electronic device of claim 1, wherein the support portion is provided to protrude from an inner wall of the housing around the entire peripheral portion of the rear surface of the display unit.

3. The electronic device of claim 1, wherein the support portion is provided to protrude in a frame shape from a bottom portion of the housing around the entire peripheral portion of the rear surface of the display unit.

* * * * *